(12) United States Patent
Lee

(10) Patent No.: US 10,394,487 B2
(45) Date of Patent: Aug. 27, 2019

(54) MEMORY SYSTEM AND OPERATING METHOD THEREOF

(71) Applicant: SK hynix Inc., Gyeonggi-do (KR)

(72) Inventor: Jong-Min Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 79 days.

(21) Appl. No.: 15/438,890

(22) Filed: Feb. 22, 2017

(65) Prior Publication Data

US 2018/0024770 A1 Jan. 25, 2018

(30) Foreign Application Priority Data

Jul. 21, 2016 (KR) ........................ 10-2016-0092415

(51) Int. Cl.
*G06F 3/06* (2006.01)

(52) U.S. Cl.
CPC ............ *G06F 3/0656* (2013.01); *G06F 3/061* (2013.01); *G06F 3/0688* (2013.01)

(58) Field of Classification Search
CPC combination set(s) only.
See application file for complete search history.

(56) References Cited

U.S. PATENT DOCUMENTS

| 8,250,328 | B2* | 8/2012 | Farrell | G06F 13/161 |
| | | | | 711/155 |
| 8,705,286 | B2 | 4/2014 | Li | |
| 8,867,275 | B2 | 10/2014 | Shin et al. | |
| 2013/0128671 | A1* | 5/2013 | Shin | G11C 16/10 |
| | | | | 365/185.18 |

* cited by examiner

*Primary Examiner* — Yong J Choe
(74) *Attorney, Agent, or Firm* — IP & T Group LLP

(57) ABSTRACT

A memory system may include: a memory device including memory blocks each memory block including pages, each page including memory cells which are coupled to a word line for storing data; and a controller including a memory, the controller receiving a write command and a read command from a host, storing write data corresponding to the write command in the memory, transmitting and storing the write data stored in the memory to and in at least one first memory device buffer coupled to a first memory block in a page of which the write data are to be stored, reading read data corresponding to the read command from a page of a second memory block, storing the read data in at least one second memory device buffer coupled to the second memory block, and storing the read data stored in the second memory device buffer, in the memory.

20 Claims, 10 Drawing Sheets

MEMORY SYSTEM AND OPERATING METHOD THEREOF

CROSS-REFERENCE TO RELATED APPLICATION

This application claims priority under 35 U.S.C. § 119(a) to Korean Patent Application No. 10-2016-0092415 filed on Jul. 21, 2016 in the Korean Intellectual Property Office, the disclosure of which is incorporated herein by reference in its entirety.

TECHNICAL FIELD

Exemplary embodiments relate generally to a memory system for processing data to and from a memory device, and an operating method thereof.

DISCUSSION OF THE RELATED ART

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having memory devices for storing data. The memory system may be used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system and an operating method thereof exhibiting improved performance and maximizing use efficiency of a memory device employed by the memory system. The memory system operating method thereof can quickly and stably process data to and from the memory device.

In an embodiment, a memory system may include: a memory device including a plurality of memory blocks each memory block including a plurality of pages, each page including a plurality of memory cells which are coupled to a word line for storing data; and a controller including a memory, the controller being suitable for receiving a write command and a read command from a host, storing write data corresponding to the write command in the memory, transmitting and storing the write data stored in the memory to and in at least one first memory device buffer operatively coupled to a first memory block in a page of which the write data are to be stored, reading read data corresponding to the read command from a page of a second memory block, storing the read data in at least one second memory device buffer operatively coupled to the second memory block, and storing the read data stored in the second memory device buffer, in the memory.

The controller may store the write data in the first memory device buffer, then stops performing the program operation, and may perform the read operation in a state in which performing of the program operation is stopped.

The controller may complete the read operation by providing the read data stored in the memory, to the host and then after completion of the read operation the controller resumes and completes the program operation.

The controller may write and may store the write data which are stored in the first memory device buffer, in pages of the first memory block.

The controller may receive simultaneously the write command and the read command from the host.

The controller may receive the read command from the host, after receiving the program command and before completing the program operation.

In an embodiment, a memory system may include: a memory device including a plurality of memory dies, each of the plurality of memory dies including a plurality of planes, each of the plurality of planes including a plurality of memory blocks; and a controller including a memory, and suitable for receiving a write command and a read command from a host, storing write data corresponding to the write command, in the memory, transmitting and storing the write data stored in the memory, to and in at least one first buffer of a first memory die for which a program operation corresponding to the write command is to be performed, among the plurality of memory dies, reading read data corresponding to the read command from pages of memory blocks included in the first memory die, storing the read data in at least one second buffer of the first memory die, and storing the read data stored in the second buffer, in the memory.

The controller may stop performing of the program operation by storing the write data in the first buffer, and may perform the read operation corresponding to the read command, in pages of memory blocks included in the first memory die, in a state in which performing of the program operation is stopped.

The controller may resume the program operation with the stopped state, after completing performing of the read operation by providing the read data stored in the memory, to the host.

The controller may write and may store, after completing performing of the read operation, the write data stored in the first buffer, in pages of memory blocks included in the first memory die.

The controller may receive simultaneously the write command and the read command from the host.

The controller may receive the read command from the host, after storing the write data in the memory and before completing performing of the program operation.

In an embodiment, a method for operating a memory system may include: receiving a write command and a read command from a host, for a memory device including a plurality of memory dies, each of the plurality of memory dies including a plurality of planes, each of the plurality of planes including a plurality of memory blocks; storing write data corresponding to the write command, in a memory included in a controller; transmitting and storing the write data stored in the memory, to and in at least one first buffer included in the plurality of memory dies; reading read data corresponding to the read command from pages of memory blocks included in the plurality of memory dies, and storing the read data in at least second buffer included in the plurality of memory dies; and storing the read data stored in the second buffer, in the memory.

The method may further include: stopping performing of a program operation corresponding to the write command, by storing the write data in the first buffer; and performing a read operation corresponding to the read command, in a state in which performing of the program operation is buffered.

The method may further include: resuming the program operation with the stopped state, after completing performing of the read operation by providing the read data stored in the memory, to the host.

The resuming of the program operation may include storing, after completing performing of the read operation, the write data stored in the first buffers, in pages of memory blocks included in the plurality of memory dies.

The receiving of the write command and the read command may include receiving simultaneously the write command and the read command from the host.

The receiving of the write command and the read command may include receiving the read command from the host, after storing the write data in the memory and before completing performing of the program operation corresponding to the write command.

The first buffer may be included in a first memory die for which the program operation corresponding to the write command is to be performed, among the plurality of memory dies. The second buffer may be included in a second memory die for which the read operation corresponding to the read command is to be performed, among the plurality of memory dies.

The first buffer and the second buffer may be included in a first memory die for which the program operation corresponding to the write command and the read operation corresponding to the read command are to be respectively performed, among the plurality of memory dies.

BRIEF DESCRIPTION OF THE DRAWINGS

These and other features and advantages of the present invention will become apparent to a person with ordinary skill in this art by the following detailed description of embodiments of the present invention in reference to the accompanying drawings, wherein.

DETAILED DESCRIPTION

Figure 1:
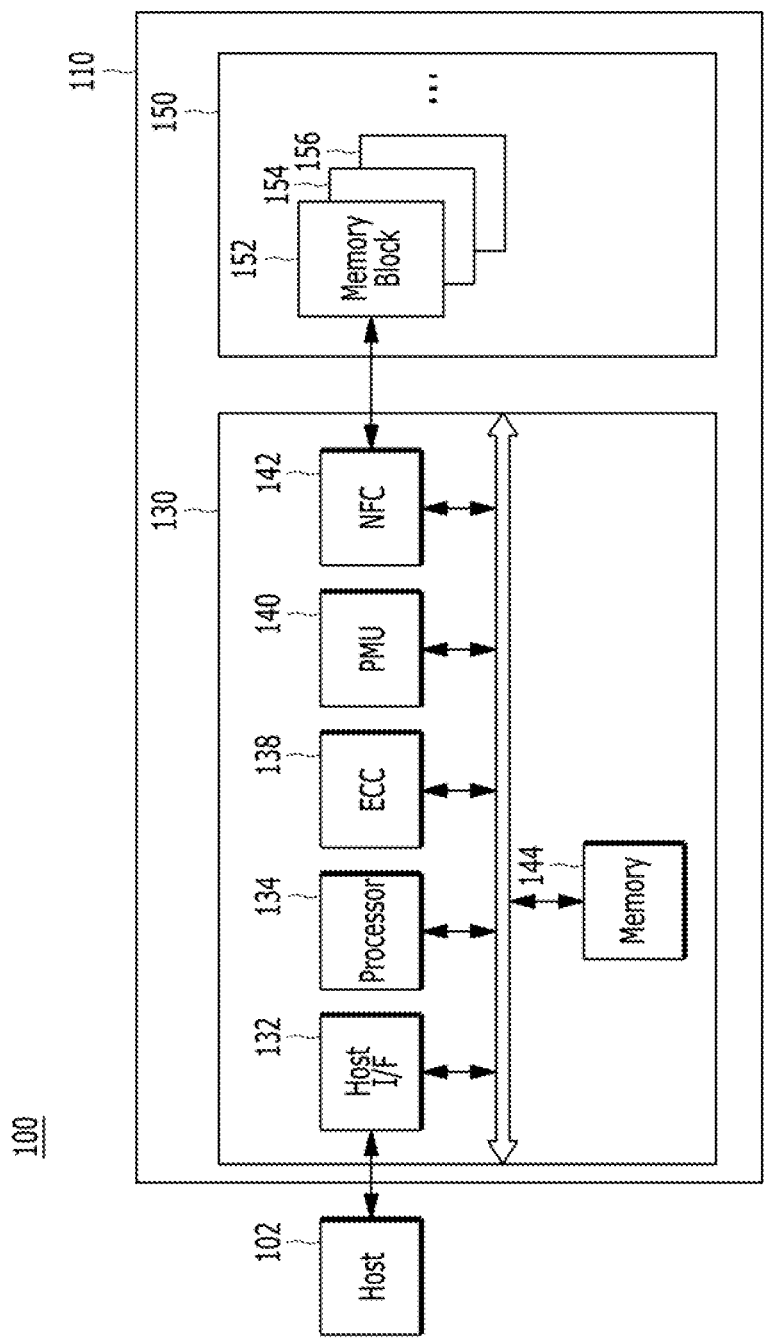
FIG. 1 is a diagram illustrating a data processing system including a memory system, according to an embodiment of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly to indicates otherwise. It will be further understood that the terms "comprises," "comprising," "includes," and "including" when used in this specification, specify the presence of the stated elements and do not preclude the presence or addition of one or more other elements. As used herein, the term "and/or" Includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system 110, according to an embodiment of the present invention.

Referring to FIG. 1, the data processing system 100 may also include a host 102 operatively coupled to the memory system 110.

The host 102 may include an electronic device, for example, a portable electronic device such as a mobile phone, an MP3 player and a laptop computer or a non-portable electronic device such as a desktop computer, a game player, a television (TV) and a projector.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device such as a dynamic random access memory (DRAM) and a static random access memory (SRAM) or a nonvolatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 and a controller 130. The memory device 150 stores data to be accessed by the host 102, and the controller 130 controls data exchange between the memory device 150 and the host 102. That is, under the control of the controller 130, data received from the host 102 may be stored in the memory device 150.

The controller 130 and the memory device 150 may be integrated into one semiconductor device. For instance, the controller 130 and the memory device 150 may be integrated into one semiconductor device to form a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device to form a memory card such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power is blocked, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each page may include a plurality of memory cells which are electrically coupled to a word line (WL). The memory cells may be single bit cells or multi-bit cells. The memory cells may be arranged in a two or a three-dimensional stacked structure. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 4.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control the overall operations of the memory device 150 including read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of error bits, and may output an error correction fall signal indicating failure in correcting the error bits.

The ECC unit 138 may perform an error correction operation based on any suitable method, including a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory. Any suitable memory interface may be employed depending upon the type of the memory device.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with a volatile memory such as a static random access memory (SRAM) or a dynamic random access memory (DRAM). As described above, the memory 144 may store data used by the host 102 and the memory device 150 for the read and write operations. For the storage of the data, the memory 144 may include a program memory, a data memory, a write buffer, a read buffer, a map buffer, and so forth.

The processor 134 may control the general operations of the memory system 110, including a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail may seriously deteriorate the utilization efficiency of the memory device 150 having a 3D stack structure and the reliability of the memory system 100, and thus a bad block management unit may be employed to manage the bad blocks and prevent utilization efficiency deterioration of the memory device 150.

Figure 2:
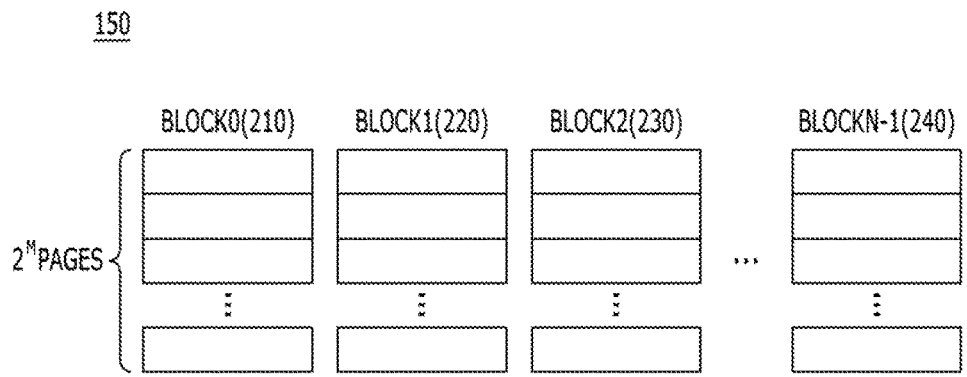
FIG. 2 is a diagram illustrating a memory device employed in the memory system of FIG. 1.

FIG. 2 is a diagram illustrating the memory device 150 shown in FIG. 1.

Referring to FIG. 2, the memory device 150 may include a plurality of memory blocks. For example, the memory device 150 may include a zeroth memory block (BLOCK0) 210, a first memory block (BLOCK1) 220, a second memory block (BLOCK2) 230 and an N–1$^{th}$ memory block (BLOCKN–1) 240. Each of the memory blocks 210 to 240 may include a plurality of pages, for example, $2^M$ number of pages ($2^M$ PAGES). Each page may include a plurality of memory cells which are electrically coupled to a word line.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the memory blocks 210 to 240 may store the data provided from the host 102 during a write operation, and provide the stored data to the host 102 during a read operation.

Figure 3:
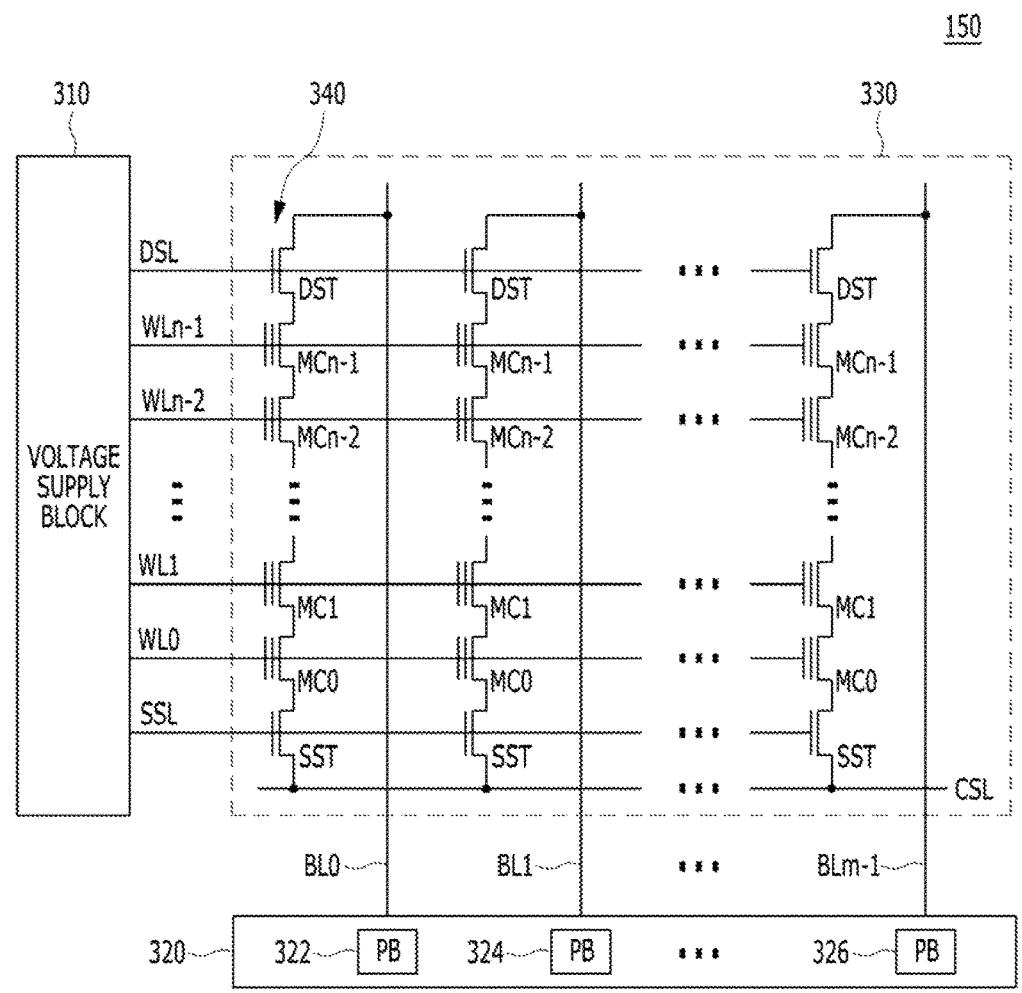
FIG. 3 is a diagram illustrating an exemplary configuration of a memory block in a memory device, according to an embodiment of the present invention.

FIG. 3 is a diagram illustrating a memory device 150 including the memory block shown in FIG. 2. For example, FIG. 3 shows a detailed configuration of a single memory block 330 and circuits related thereto 310 and 320.

Referring to FIG. 3, the memory block 330 may include a plurality of cell strings 340 which are electrically coupled to bit lines BL0 to BLm−1, respectively. The cell string 340 of each column may include at least one drain select transistor DST and at least one source select transistor SST. A plurality of memory cell transistors MC0 to MCn−1 may be electrically coupled in series between the select transistors SST and DST. The respective memory cells MC0 to MCn−1 may be configured by multi-level cells (MLC) each of which stores data information of a plurality of bits. The cell strings 340 may be electrically coupled to the corresponding bit lines BL0 to BLm−1, respectively. For reference, in FIG. 3, 'DSL' denotes a drain select line (i.e., a string select line), 'SSL' denotes a source select line (i.e., a ground select line), and 'CSL' denotes a common source line.

While FIG. 3 shows, as an example, the memory block 330 which is configured by NAND flash memory cells, it is to be noted that the memory block 330 of the memory device 300 according to an exemplary embodiment of the present invention is not limited to NAND flash memory and may be realized by a NOR flash memory, a hybrid flash memory in which at least two kinds of memory cells are combined, or a single NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example, a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers (PBs) 322, 324 and 326 respectively corresponding to columns (or bit lines) or pairs of columns (or pairs of bit lines), and a plurality of latches (not shown) may be included in each of the page buffers 322, 324 and 326.

The memory device 150 may be realized as a 2-dimensional or 3-dimensional memory device. For example, as shown in FIG. 4, in the case where the memory device 150 is realized as a 3-dimensional nonvolatile memory device, the memory device 150 may include a plurality of memory blocks BLK0 to BLKN-1.

Figure 4:
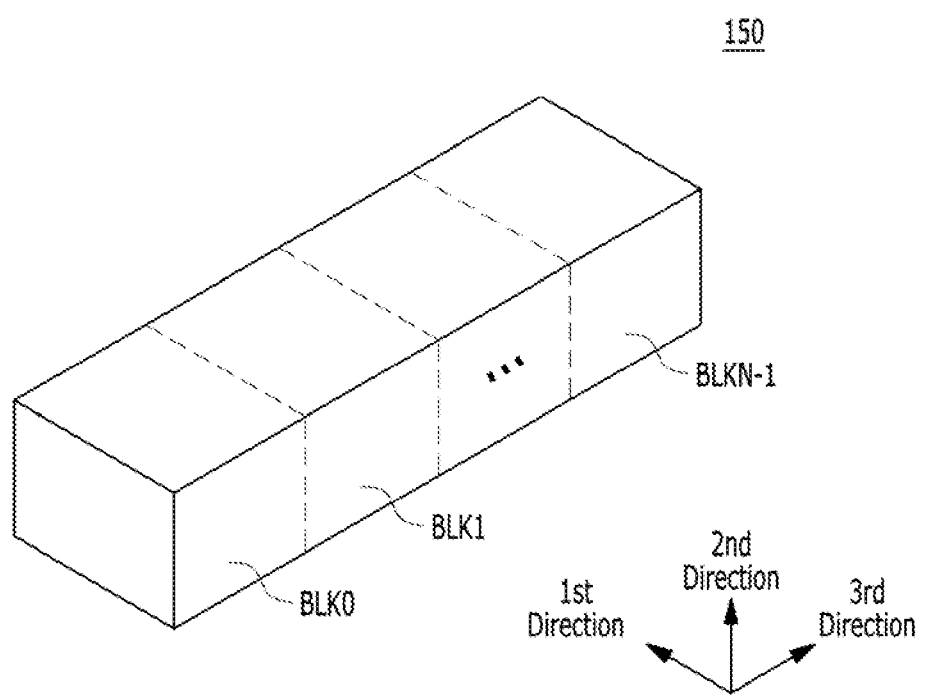
FIG. 4 is a diagram illustrating an exemplary configuration of a memory device, according to an embodiment of the present invention.

FIG. 4 is a diagram illustrating a three-dimensional configuration of the memory device 150 including a plurality of memory blocks BLK0 to BLKN-1, wherein each memory block is realized as a 3-dimensional structure. The memory blocks BLK0 to BLKN may have a vertical structure meaning that each memory block includes a plurality strings vertically oriented in relation to the plane of semiconductor substrate (not shown). For example, the respective memory blocks BLK0 to BLKN-1 may be realized as a 3-dimensional structure by including a structure which extends in first to third directions (for example, the x-axis direction, the y-axis direction and the z-axis direction).

The respective memory blocks BLK0 to BLKN-1 may include a plurality of NAND strings each extending in the second direction. The plurality of NAND strings may be spaced apart at a regular interval along the first and third directions. Each NAND string may be electrically coupled to a bit line, at least one drain select line, at least one source select line, a plurality of word lines, at least one dummy word line, and a common source line. Namely, the respective memory blocks BLK0 to BLKN-1 may be electrically coupled to a plurality of bit lines, a plurality of drain select lines, a plurality of source select lines, a plurality of word lines, a plurality of dummy word lines, and a plurality of common source lines.

Hereinbelow, detailed descriptions will be made with reference to FIGS. 5 to 8, for a data processing operation with respect to the memory device 150 in a memory system 110 in accordance with an embodiment of the present invention. In particular, the data processing operation may be a data processing operation (also referred to as a command operation) corresponding to a command received from the host 102 for processing data to and/or from the memory device 150.

Figure 5:
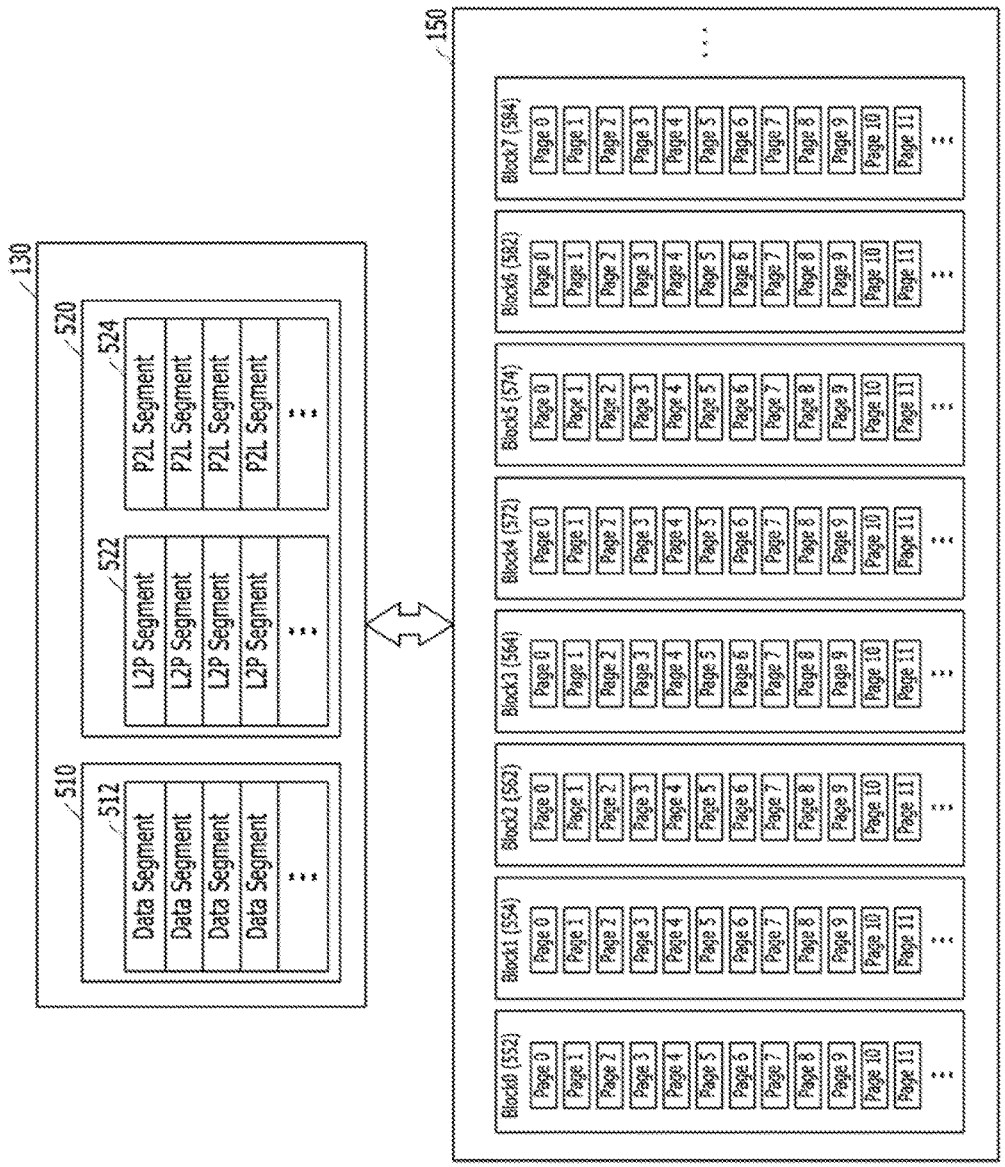
FIGS. 5 to 7 are diagrams illustrating a data processing operation with respect to a memory device in a memory system, in accordance with an embodiment of the present invention.
Figure 6:
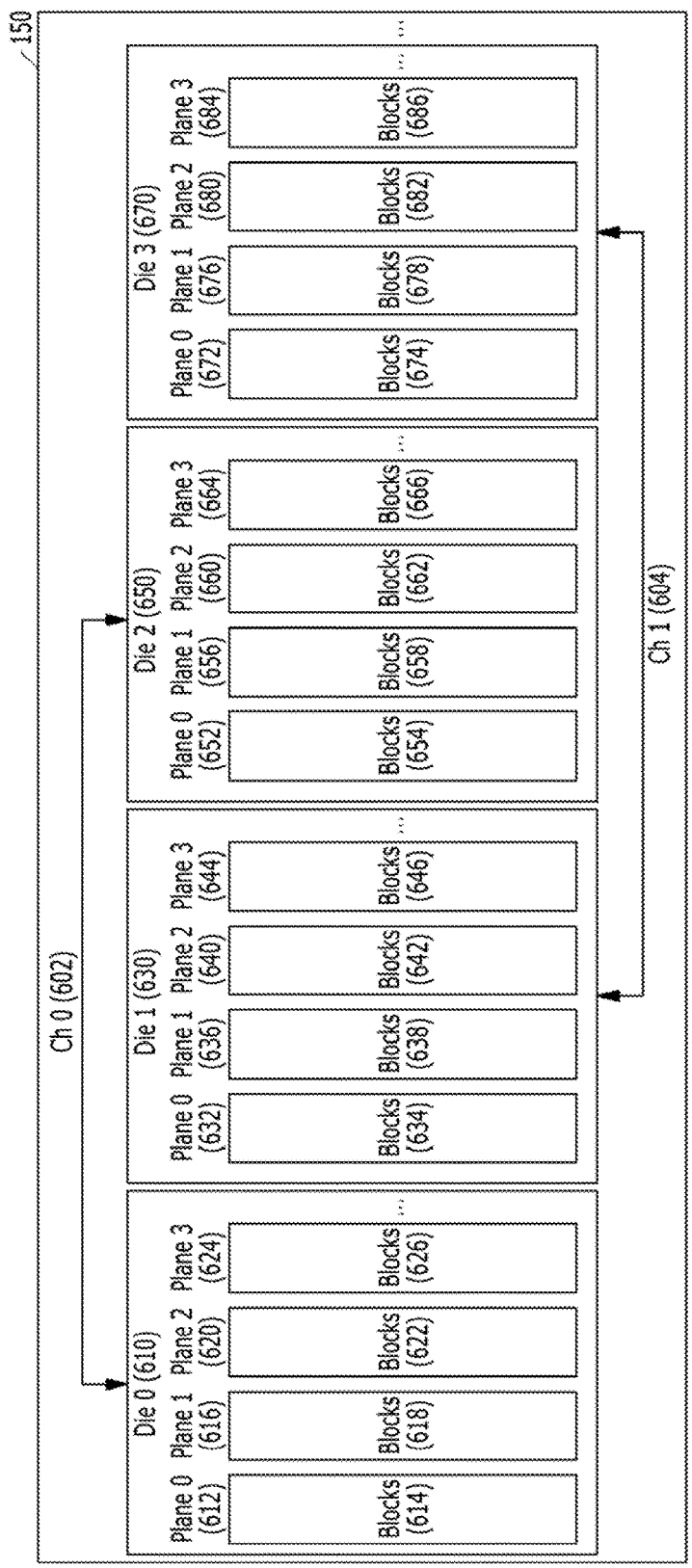
Figure 7:
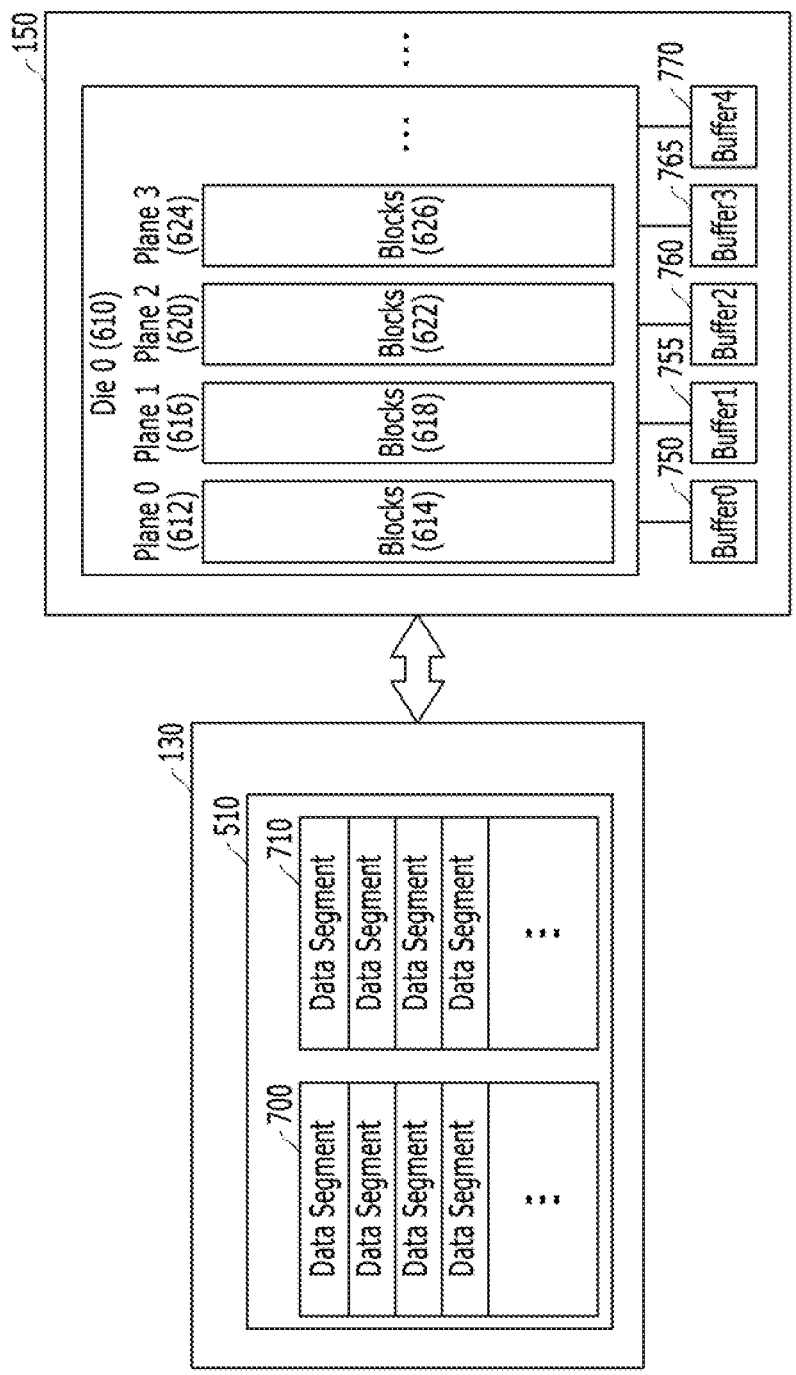

FIGS. 5 to 7 are diagrams schematically illustrating a data processing operation with respect to a memory device 150 in a memory system 110, in accordance with an embodiment of the present invention. In the embodiment of the present disclosure, for the sake of convenience in explanation, detailed descriptions will be made, as an example, for data processing in the case of performing a command operation corresponding to a command received from the host 102 in the memory system 110 shown in FIG. 1. For example, the data processing operation may include performing a program operation corresponding to a write command received from the host 102 and/or performing a read operation corresponding to a read command received from the host 102 will be described.

Hereinbelow, in the embodiment of the present disclosure, the description for a program operation will be made, as an example. That is, the description will be made, for data processing in the case where, after storing write data corresponding to the write command received from the host 102, in the buffer/cache included in the memory 144 of the controller 130, the data stored in the buffer/cache are written (that is, programmed) and stored in a plurality of memory blocks included in the memory device 150, and, after updating the data stored in the memory device 150, update data are programmed again in the memory device 150. Further, in the embodiment of the present disclosure, descriptions will be made, as an example, for data processing in the case where, after reading read data corresponding to the read command received from the host 102, from the memory device 150, and storing the read data in the buffer/cache included in the memory 144 of the controller 130, the data stored in the buffer/cache are provided to the host 102.

Further, while, in the present embodiment, it will be described below as an example that the controller 130 performs a data processing operation in the memory system 110, and the processor 134 included in the controller 130 may perform a data processing operation through a flash translation layer (FTL).

For example, after storing user data and metadata corresponding to a write command received from the host 102, in the buffer included in the memory 144 of the controller 130, the controller 130 writes and stores the data stored in the buffer, in an optional memory block among the plurality of memory blocks included in the memory device 150. That is, the controller 130 performs a program operation. Further, the controller 130 reads user data and metadata corresponding to a read command received from the host 102, from the plurality of pages included in a corresponding memory block of the memory device 150, stores the read data in the buffer included in the memory 144 of the controller 130, and provides the data stored in the buffer, to the host 102. That is, the controller 130 performs a read operation.

The metadata may include first map data and second map data, for the data stored in the memory blocks in correspondence to the program operation. The first map data may include a logical/physical (logical to physical) (L2P) Information (hereinafter, referred to as a 'logical information') and the second map data may include a physical/logical (physical to logical) (P2L) information (hereinafter, referred to as a 'physical information'). Also, the metadata may include information on the command data corresponding to the command received from the host 102, information on the command operation corresponding to the command, information on the memory blocks of the memory device 150 for which the command operation is to be performed, and information on map data corresponding to the command operation. In other words, the metadata may include all remaining information and map data excluding the user data corresponding to the command received from the host 102.

That is, in the embodiment of the present disclosure, the controller 130 performs a command operation corresponding to a command received from the host 102. For example, the controller 130 performs a program operation corresponding to a write command, in the case where the write command is received from the host 102. At this time, the user data corresponding to the write command are written and stored in memory blocks of the memory device 150. For example, the user data corresponding to the write command are written and stored in empty memory blocks, open memory blocks or free memory blocks for which an erase operation is performed, among the memory blocks of the memory device 150. Further, metadata may be written and stored in empty memory blocks, open memory blocks or free memory blocks among the memory blocks of the memory device 150. Metadata may include mapping information between logical addresses and physical addresses for the user data stored in the memory blocks, as first map data, and mapping information between physical addresses and logical addresses for the memory blocks in which the user data are stored, as second map data. The first map data may include an L2P map table or an L2P map list in which logical information are recorded. The second map data may include a P2L map table or a P2L map list in which physical information are recorded.

In particular, when a write command is received from the host 102, the controller 130 writes and stores user data corresponding to the write command, in the memory blocks, and stores metadata including first map data and second map data for the user data stored in the memory blocks, in the memory blocks. At this time, the controller 130 stores data segments of the user data and meta segments of the metadata in the memory 144 included in the controller 130. That is, the controller 130 stores the data segments of the user data and the L2P segments of the first map data and the P2L segments of the second map data as the map segments of map data, in the memory 144 included in the controller 130. After the controller 130 stores the data segments of the user data and the meta segments of the metadata in the memory 144 included in the controller 130, the controller 130 stores the data segments of the user data and the meta segments of the metadata in the memory blocks of the memory device 150. In particular, as the data segments of the user data are stored in the memory blocks of the memory device 150, the controller 130 generates, updates and stores meta segments. That is, the controller 130 performs a map flush operation.

Furthermore, the controller 130 performs a command operation corresponding to a command received from the host. That is, the controller 130 performs a read operation corresponding to a read command, in the case where the read command is received from the host 102. At this time, user data corresponding to the read command are read from the memory blocks of the memory device 150. In particular, by checking map data for the user data, data stored in the pages of a corresponding memory block among the memory blocks of the memory device 150 are read. The data read from the memory device 150 are stored in the memory 144 included in the controller 130, and are then provided to the host 102. In order to check the map data of the user data corresponding to the read command, the controller 130 loads the map segments of the map data in the memory 144 included in the controller 130, and then checks the map data. Hereinbelow, a data processing operation in the memory system in accordance with the embodiment will be described in detail with reference to FIGS. 5 to 7.

Referring to FIG. 5, the controller 130 performs a command operation corresponding to a command received from the host 102. For example, the controller 130 performs a program operation corresponding to a write command received from the host 102. At this time, the controller 130 writes and stores user data corresponding to the write command, in memory blocks 552, 554, 562, 564, 572, 574, 582 and 584 of the memory device 150. Also, in correspondence to the write operation to the memory blocks 552, 554, 562, 564, 572, 574, 582 and 584, the controller 130 generates and updates metadata for the user data and writes and stores the metadata in the memory blocks 552, 554, 562, 564, 572, 574, 582 and 584 of the memory device 150.

The controller 130 generates and updates information indicating that the user data are stored in the pages included in the memory blocks 552, 554, 562, 564, 572, 574, 582 and 584 of the memory device 150. For example, the controller 130 generates and updates first map data and second map data. That is, the controller 130 generates and updates the logical segments (that is, L2P segments) of the first map data and the physical segments (that is, P2L segments) of the second map data. Then, the controller 130 stores the L2P segments and the P2L segments in the pages included the memory blocks 552, 554, 562, 564, 572, 574, 582 and 584 of the memory device 150, by performing a map flush operation.

For example, the controller 130 caches and buffers the user data corresponding to the write command received from the host 102, in a first buffer 510 included in the memory 144 of the controller 130. That is, the controller 130 stores data segments 512 of the user data in the first buffer 510 as a data buffer/cache. Then, the controller 130 writes and stores the data segments 512 stored in the first buffer 510, in the pages included in the memory blocks 552, 554, 562, 564, 572, 574, 582 and 584 of the memory device 150.

As the data segments 512 of the user data corresponding to the write command received from the host 102 are written and stored in the pages included in the memory blocks 552, 554, 562, 564, 572, 574, 582 and 584 of the memory device 150, the controller 130 generates the first map data and the second map data. Then, the controller 130 stores the first map data and the second map data in a second buffer 520 included in the memory 144 of the controller 130. Namely, the controller 130 stores L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data. Alternatively, in the second buffer 520, there may be stored a map list for the L2P segments 522 of the first map data and a map list for the P2L segments 524 of the second map data. The controller 130 writes and stores the L2P segments 522 of the first map data and the P2L segments 524 of the second map data which are stored in the second buffer 520, in the pages included in the memory blocks 552, 554, 562, 564, 572, 574, 582 and 584 of the memory device 150.

Also, the controller 130 may perform another command operation corresponding to a command received from the host 102. For example, the controller 130 may perform a read operation corresponding to a read command received from the host 102. At this time, the controller 130 loads the map segments of user data corresponding to the read command in the second buffer 520. For example, the controller 130 loads L2P segments 522 of first map data and P2L segments 524 of second map data, in the second buffer 520, and checks the L2P segments 522 and the P2L segments 524. After that, the controller 130 reads the user data stored in the pages included in corresponding memory blocks among the memory blocks 552, 554, 562, 564, 572, 574, 582 and 584 of the memory device 150, stores data segments 512 of the read user data in the first buffer 510, and provides the data segments 512 to the host 102.

Referring to FIG. 6, the memory device 150 may include a plurality of memory dies. For example, the memory device 150 includes a memory die 0 610, a memory die 1 630, a memory die 2 650 and a memory die 3 670. Each of the memory dies 610, 630, 650 and 670 may include a plurality of planes. For example, the memory die 0 610 includes a plane 0 612, a plane 1 616, a plane 2 620 and a plane 3 624, the memory die 1 630 includes a plane 0 632, a plane 1 636, a plane 2 640 and a plane 3 644, the memory die 2 650 includes a plane 0 652, a plane 1 656, a plane 2 660 and a plane 3 664, and the memory die 3 670 includes a plane 0 672, a plane 1 676, a plane 2 680 and a plane 3 684. The respective planes 612, 616, 620, 624, 632, 636, 640, 644, 652, 656, 660, 664, 672, 676, 680 and 684 in the memory dies 610, 630, 650 and 670 included in the memory device 150 include a plurality of memory blocks 614, 618, 622, 626, 634, 638, 642, 646, 654, 658, 662, 666, 674, 678, 682 and 686. For example, each of the plurality of memory blocks includes N number of blocks Block0, Block1, . . . and BlockN−1, each including a plurality of pages (for example, $2^M$ number of pages), as described above with reference to FIG. 2. The plurality of memory dies of the memory device 150 are coupled to the same channels. For example, the memory die 0 610 and the memory die 2 650 are coupled to a channel 0 602, and the memory die 1 630 and the memory die 3 670 are coupled to a channel 1 604.

In the embodiment of the present disclosure, in consideration of program sizes in the memory blocks 614, 618, 622, 626, 634, 638, 642, 646, 654, 658, 662, 666, 674, 678, 682 and 686 of the respective planes 612, 616, 620, 624, 632, 636, 640, 644, 652, 656, 660, 664, 672, 676, 680 and 684 included in the respective memory dies 610, 630, 650 and 670 of the memory device 150 as described above with reference to FIG. 6, user data and metadata for a command operation corresponding to a command received from the host 102 are written and stored in the pages included in the respective memory blocks 614, 618, 622, 626, 634, 638, 642, 646, 654, 658, 662, 666, 674, 678, 682 and 686. In particular, after grouping the memory blocks 614, 618, 622, 626, 634, 638, 642, 646, 654, 658, 662, 666, 674, 678, 682 and 686 into a plurality of super memory blocks, user data and metadata for a command operation corresponding to a command received from the host 102 may be written and stored in the super memory blocks. For example, the user data and the metadata for the command operation may be written and stored in the super memory blocks through a one shot program.

Each of the super memory blocks may Include a plurality of memory blocks (for example, a first memory block and a second memory block). In this regard, in the case where the first memory block is a certain memory block included in a first plane of a first memory die among the plurality of memory dies, the second memory block may be any memory block which is included in the first plane of the first memory die and is other than the certain memory block, or any memory block which is included in a second plane of the first memory die, or any memory block which is included in any one of a plurality of planes of a second memory die among the plurality of memory dies. That is to say, the second memory block may be a memory block which is included in the same memory die and the same plane as the first memory block, or a memory block which is included in a different plane in the same memory die as the first memory block, or a memory block which is included in a memory die different from the first memory block. Furthermore, each of the super memory blocks may include at least two memory blocks among memory blocks included in the same plane of the same memory die, or memory blocks included in different planes of the same memory die or memory blocks included in different memory dies.

In the embodiment of the present disclosure, as described above with reference to FIG. 6, a plurality of page buffers, caches or registers may be included in each of the respective memory dies 610, 630, 650 and 670 of the memory device 150. Also, as described above with reference to FIG. 5, in the case of performing a command operation corresponding to a command received from the host 102 (for example, a program operation or a read operation), data corresponding to the command operation are transmitted to the page buffers of each of the respective memory dies 610, 630, 650 and 670, and thereafter, the command operation is performed. Hereinbelow, a program operation and a read operation in the respective memory dies 610, 630, 650 and 670 included in the memory device 150 in the memory system in accordance with the embodiment will be described in detail with reference to FIG. 7, by taking an example.

Referring to FIG. 7, the memory device 150 may include a plurality of memory dies, each of the memory dies may include a plurality of planes, and each of the planes may include a plurality of memory blocks. The memory device 150 may include a plurality of page buffers, caches or registers corresponding to each memory die. In the embodiment of the present disclosure, for the sake of convenience in explanation, detailed descriptions will be made by taking an example that 5 buffers are included in each memory die, as page buffers, caches or registers.

For example, in the embodiment of FIG. 7, in the memory device 150 of the memory system 110, the memory die 0 610 of the memory device 150 may include a plurality of page buffers (for example, a buffer 0 750, a buffer 1 755, a buffer 2 760, a buffer 3 765 and a buffer 4 770). As described above, when a write command is received from the host 102, the controller 130 stores data segments 700 of user data (that is, write data) corresponding to the write command, in the first buffer 510 included in the memory 144 of the controller 130. At this time, in the case where a read command is received from the host 102, the controller 130 transmits the data segments 700 of the write data stored in the first buffer 510, to the buffers included in the memory die 0 610 of the memory device 150. For example, the controller 130 transmits the data segments 700 to the buffer 0 750, the buffer 1 755 and the buffer 2 760 of the memory die 0 610.

In detail, when the write command is received from the host 102, the controller 130 stores the data segments 700 of the write data in the first buffer 510 of the memory 144. At this time, if the read command is received from the host 102 in a state in which performing of a program operation corresponding to the write command is not completed, the controller 130 transmits the data segments 700 of the write data stored in the first buffer 510, to the buffer 0 750, the buffer 1 755 and the buffer 2 760 included in the memory die 0 610, and accordingly, the first buffer 510 transitions to an empty state. In the state in which the data segments 700 of the write data are stored in the buffer 0 750, the buffer 1 755 and the buffer 2 760, the controller 130 may then perform a read operation corresponding to the received read command. That is to say, the controller 130 may read the data segments of user data (that is, read data) corresponding to the read command, from the pages of the memory blocks included in the memory die 0 610, and stores the data segments of the read data in one or more of the empty buffers included in the memory die 0 610, e.g., the buffers 3 765 and 4 770. Then, the controller 130 transmits and stores data segments 710 of the read data stored in the buffer 3 765 and the buffer 4 770, to and in the first buffer 510 of the memory 144, and then provides the data segments 710 of the read data which are stored in the first buffer 510 to the host 102.

Thereafter, the controller 130 writes and stores the data segments of the write data stored in the buffer 0 750, the buffer 1 755 and the buffer 2 760, in the memory blocks included in the memory die 0 610. That is, the controller 130 completes the program operation which was interrupted in order to perform the read operation which was received after the program operation had started but before was completed. At this time, the data segments of the write data stored in the buffer 0 750, the buffer 1 755 and the buffer 2 760 are stored in the pages of the memory blocks included in the memory die 0 610 through a one shot program.

Also, in the case where a write command and a read command are simultaneously received from the host 102, the controller 130 stores data segments 700 of user data corresponding to the write command (that is write data), in the first buffer 510 included in the memory 144 of the controller 130. Then, the controller 130 transmits the data segments 700 of the write data stored in the first buffer 510, to the buffers included in the memory die 0 610 of the memory device 150. For example, the controller 130 transmits the data segments 700 of the write data to the buffer 0 750, the buffer 1 755 and the buffer 2 760. At this time, the first buffer 510 included in the memory 144 of the controller 130 transitions to an empty state.

In the state in which the data segments 700 of the write data are stored in the buffer 0 750, the buffer 1 755 and the buffer 2 760, the controller 130 performs a read operation corresponding to the received read command. That is to say, the controller 130 reads the data segments of user data (that is, read data) corresponding to the read command, from the pages of the memory blocks included in the memory die 0 610, and stores the data segments of the read data in one or more of the empty buffers included in the memory die 0 610. For example, the controller 130 reads the data segments of read data and stores them in the buffer 3 765 and the buffer 4 770. Then, the controller 130 transmits and stores data segments 710 of the read data which are stored in the buffer 3 765 and the buffer 4 770, to and in the first buffer 510. The controller 130 may then transfer the data segments 710 of the read data which are stored in the first buffer 510 to the host 102.

Thereafter, the controller 130 writes and stores the data segments of the write data which are stored in the buffer 0 750, the buffer 1 755 and the buffer 2 760, in the memory blocks included in the memory die 0 610. That is, the controller 130 completes the program operation which was partially performed when the read and the program operations were received simultaneously. At this time, the data segments of the write data stored in the buffer 0 750, the buffer 1 755 and the buffer 2 760 may be stored in the pages of the memory blocks included in the memory die 0 610 through a one shot program.

In this way, in the memory system in accordance with an embodiment of the present disclosure, in the case where a read command is received from the host 102 in a state in which performing of a program operation corresponding to a write command received from the host 102 is not completed or in the case where a write command and a read command are simultaneously received from the host 102, data segments 700 of user data (that is, write data) corresponding to the write command are stored in the first buffer 510 of the controller 130. The data segments 700 of the write data stored in the first buffer 510 are transmitted to the buffers of a memory die including memory blocks for which a program operation is to be performed, in the memory device 150. For example, the data segments 700 of the write data stored in the first buffer 510 are transmitted to the buffer 0 750, the buffer 1 755 and the buffer 2 760 of the memory die 0 610, thereby causing the first buffer 510 to transition to an empty state.

Then, in accordance with an embodiment of the present disclosure, as described above, the memory system is capable in a state in which performing of a program operation is not completed to put the program operation on hold, and perform a read operation corresponding to the received read command which is received simultaneously with the program command or after the program command. In other words, when a program and a read command are received simultaneously or when the read command is received after the program command and before the program command is completed, the memory system performs the read operation in a state in which performing of the program operation is buffered by storing the data segments 700 of the write data in the buffer 0 750, the buffer 1 755 and the buffer 2 760 of the memory die 0 610. Namely, the controller 130 reads data segments 710 of user data (that is, read data) corresponding to the read command, from the pages of corresponding memory blocks in the memory device 150, and stores the data segments 710 of the read data in the buffer 3 765 and the buffer 4 770 of a memory die including the corresponding memory blocks (for example, the memory die 0 610). The controller 130 transmits and stores the data segments 710 of the read data stored in the buffer 3 765 and the buffer 4 770 of the memory die 0 610, to and in the first buffer 510 of the controller 130. Then, the controller 130 provides the data segments 710 of the read data stored in the first buffer 510, to the host 102, thereby completing performing of the read operation.

Further, in the memory system in accordance with an embodiment of the present disclosure, after the read operation is completed, the program operation in the buffered state (or stopped state) is resumed and completed. That is, the data segments 700 of the write data stored in the buffer 0 750, the buffer 1 755 and the buffer 2 760 of the memory die 0 610 are written and stored in the pages of corresponding memory blocks in the memory die 0 610, thereby completing the program operation.

In the embodiment of the present disclosure, for the sake of convenience in explanation, descriptions were made by taking an example that a program operation corresponding to a write command received from the host 102 and a read operation corresponding to a read command received from the host 102 are performed in the memory blocks of the same memory die (that is, the memory die 0 610, in the memory device 150). However, it is to be noted that a program operation and a read operation may be performed in the memory blocks of different memory dies. That is to say, in the memory system in accordance with the embodiment of the present disclosure, the controller 130 may transmit and store data segments 700 of write data corresponding to a program operation, to and in the buffers of a memory die of memory blocks for which the program operation is to be performed. For example, the controller 130 may transmit and store data segments 700 of write data to and in the buffers of the memory die 1 630. Then, the controller 130 may perform a read operation. For example, the controller 130 may read data segments 710 of read data from the pages of the memory blocks included in the memory die 2 650, and may store the data segments 710 of the read data in the buffers of the memory die 2 650. Then, the controller 130 may transmit the data segments 710 of the read data stored in the buffers of the memory die 2 650, to the first buffer 510, and may provide the data segments 710 of the read data to the host 102. Thereafter, the controller 130 may resume the program operation. In other words, the controller 130 may write and store the data segments 700 of the write data stored in the buffers of the memory die 1 630, in the pages of the memory blocks included in the memory die 1 630.

As a consequence, in the memory system in accordance with an embodiment of the present disclosure, in a state in which write data corresponding to a write command received from the host 102 are transmitted and stored in the buffers included in the memory device 150, a read operation corresponding to a read command received from the host 102 is performed. That is, in a state in which performing of a program operation corresponding to the write command is buffered, the read operation is performed. Namely, the read operation is performed by reading read data corresponding to the read command from corresponding memory blocks of the memory device 150, storing the read data in the buffers included in the memory device 150 and providing the read data to the host 102. As a consequence, since the read operation is quickly performed, the performance of the read operation may be improved. By storing the write data in the buffers included in the memory device 150 to perform the read operation, the utilization efficiency of the memory 144 included in the controller 130 may be improved. In particular, in the memory system in accordance with an embodiment of the present disclosure, by performing a read operation preferentially to a program operation, read data may be quickly provided to the host 102, and accordingly, quality service may be provided to a user of the host 102. Moreover, in the memory system in accordance with an embodiment of the present disclosure, by performing dynamically a plurality of command operations requested from the host 102, according to priorities, the utilization efficiency of the memory device 150 may be improved. Hereinbelow, an operation for processing data in a memory system in accordance with an embodiment will be described in detail with reference to FIG. 8.

Figure 8:
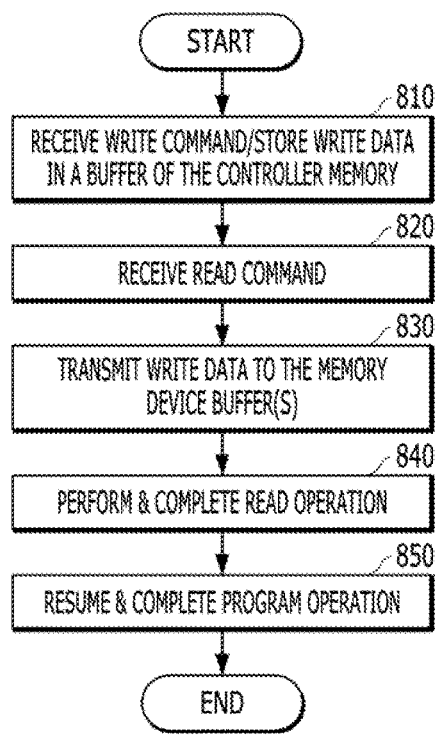
FIG. 8 is a flow chart illustrating an operation method for processing data in a memory system in accordance with an embodiment of the present invention.

FIG. 8 is a flow chart illustrating an operation process for processing data in a memory system in accordance with an embodiment of the present invention.

Referring to FIG. 8, at step 810, in the memory system of FIG. 1, in the case where a write command is received from the host 102, write data corresponding to the write command are stored in a buffer in the memory 144 of the controller 130.

At step 820, a read command is received from the host 102. That is to say, in a state in which performing of a program operation corresponding to the write command is not completed, a read command is received from the host 102.

Then, at step 830, the write data stored in the memory 144 of the controller 130 are transmitted to the buffers included in the memory device 150. Accordingly, the write data stored in the memory 144 of the controller 130 are stored in the buffers of the memory device 150, and the memory 144 of the controller 130 becomes an empty state.

Then, at step 840, the controller 130 may perform and complete the read operation corresponding to the read command, and provides the read data to the host 102. The read operation is performed in the state in which performing of the program operation is buffered (or stopped) by storing the write data in the buffers of the memory device 150. Therefore, the read data corresponding to the read command are read from the pages of the memory blocks included in the memory device 150. After the read data are stored in one or more empty buffers of the memory device 150, the read data are transmitted and stored to and in the memory 144 of the controller 130. By providing the read data stored in the memory 144 of the controller 130, to the host 102, performing of the read operation is completed.

At step 850, the program operation in the buffered state (or stopped state) is resumed and completed. That is to say, the write data stored in the buffers of the memory device 150 are written and stored in the pages of the memory blocks included in the memory device 150. At this time, the write data may be stored in the memory blocks of the memory device 150 through a one shot program.

Since detailed descriptions were made above with reference to FIGS. 5 to 8 for performing a program operation and a read operation for the memory blocks included in the memory device of a memory system, further descriptions thereof will be omitted herein. In particular, the detailed descriptions were made above for completing performing of a read operation and a program operation by performing the read operation in a state in which performance of the program operation is buffered (or stopped) through storing write data corresponding to a write command, in the buffers of the memory device, that is, by performing the read operation through reading read data corresponding to a read command, from the pages of the memory blocks included in the memory device, storing the read data in the buffers of the memory device, transmitting the read data to a memory of a controller and then providing the read data to a host, and then by resuming the program operation of the buffered state (or stopped state), further descriptions thereof will be omitted herein. Hereinbelow, detailed descriptions will be made with reference to FIGS. 9 to 14, for a data processing system and electronic appliances to which the memory system 110 including the memory device 150 and the controller 130 described above with reference to FIGS. 1 to 8, in accordance with the embodiment, is applied.

Figure 9:
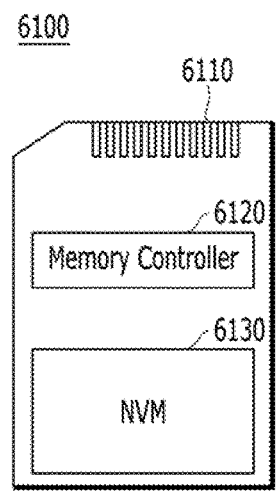
FIGS. 9 to 14 are diagrams illustrating exemplary configurations of memory systems according to various embodiments of the present invention.

FIG. 9 is a diagram illustrating a data processing system including the memory system according to the embodiment. For example, FIG. 9 illustrates a memory card system 6100 to which the memory system according to an embodiment is applied.

Referring to FIG. 9, the memory card system 6100 may include a memory controller 6120, a memory device 6130, and a connector 6110.

In detail, the memory controller 6120 may be connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCI-e), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless-fidelity (WI-FI) and Bluetooth. Accordingly, the memory system and the data processing system according to the embodiment may be applied to wired/wireless electronic appliances, for example, a mobile electronic appliance.

The memory device 6130 may be implemented with a nonvolatile memory (NVM). For example, the memory device 6130 may be implemented with one of various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (e.g., Personal Computer Memory Card International Association (PCMCIA)), a compact flash card (CF), a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
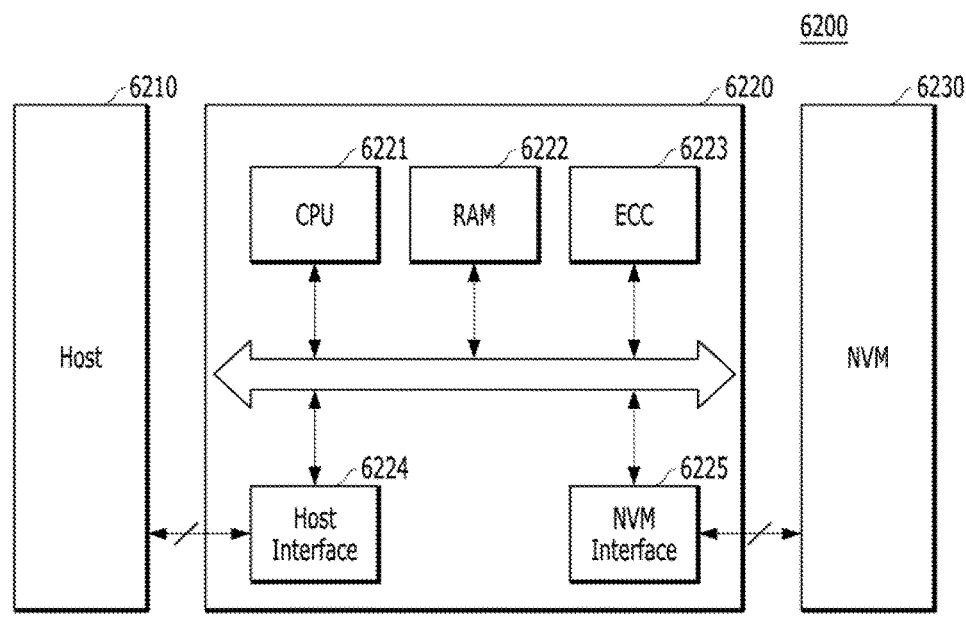

FIG. 10 is a diagram schematically illustrating another example of a data processing system 6200 including a memory system according to an embodiment of the present invention.

Referring to FIG. 10, the data processing system 6200 may include a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include at least one of a central processing unit (CPU) 6221, a random access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using one of various coded modulations such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 may transmit and receive data to and from the host 6210 through the host interface 6224, and transmit and receive data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is implemented, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, for example, a mobile electronic appliance.

Figure 11:
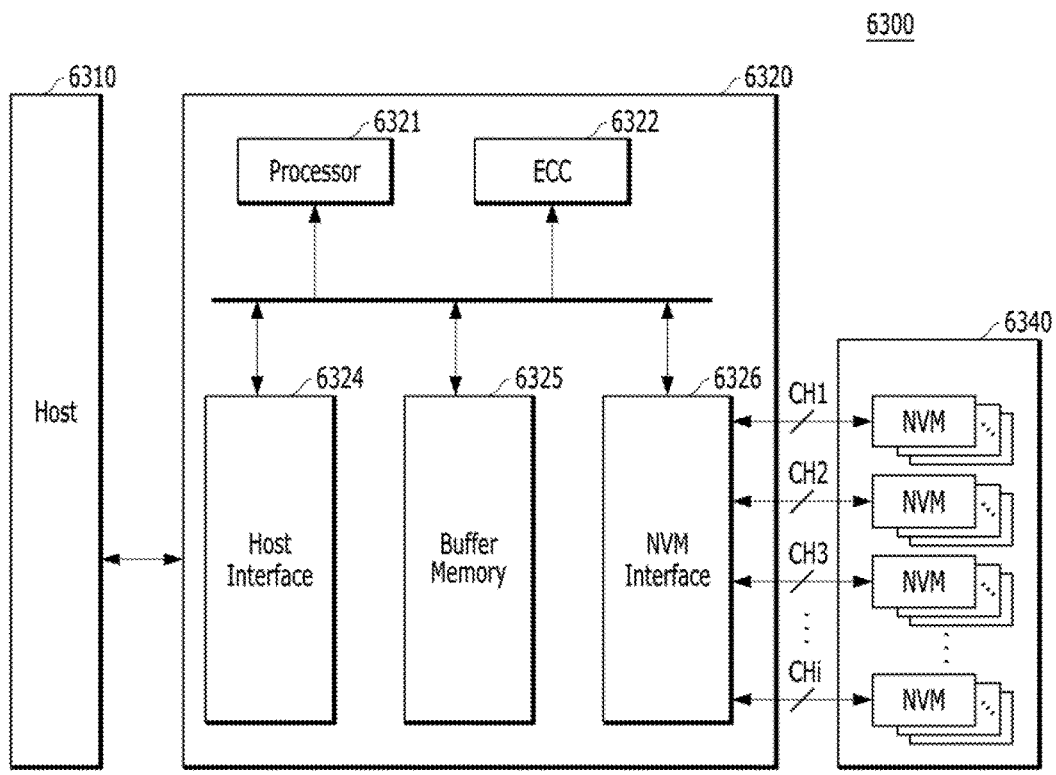

FIG. 11 is a diagram illustrating another example of a data processing system including a memory system according to an embodiment of the invention. For example, in FIG. 11 may be a solid state drive (SSD) 6300 employing a memory system is shown, according to an embodiment of the present invention.

Referring to FIG. 11, the SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

In detail, the controller 6320 may be connected with the memory device 6340 through a plurality of channels CH1, CH2, CH3, . . . and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 may temporarily store data received from a host 6310 or data received from a plurality of nonvolatile memories NVMs included in the memory device 6340, or temporarily store metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 11, for the sake of convenience in explanation, that the buffer memory 6325 is disposed inside the controller 6320, it is to be noted that the buffer memory 6325 may be disposed outside the controller 6320.

The ECC circuit 6322 may calculate error correction code values of data to be programmed in the memory device 6340 in a program operation, perform an error correction operation for data read from the memory device 6340, based on the error correction code values, in a read operation, and perform an error correction operation for data recovered from the memory device 6340 in a recovery operation for failed data.

The host interface 6324 may provide an interface function with respect to an external device such as the host 6310. The nonvolatile memory interface 6326 may provide an interface function with respect to the memory device 6340 which is connected through the plurality of channels CH1, CH2, CH3, . . . and CHI.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (for example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (for example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 12:
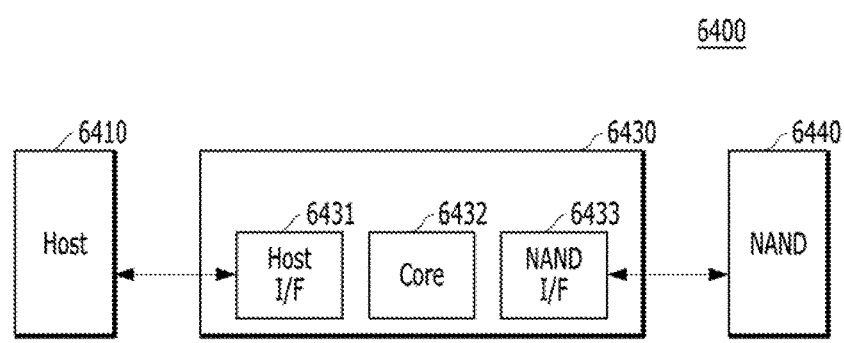

FIG. 12 is a diagram illustrating another example of a data processing system including the memory system according to an embodiment of the present invention. For example, in FIG. 12, an embedded multimedia card (eMMC) 6400 employing a memory system is shown.

Referring to FIG. 12, the eMMC 6400 may include a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 may be connected with the memory device 6440 through a plurality of channels. The controller 6430 may include a core 6432, a host Interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 13:
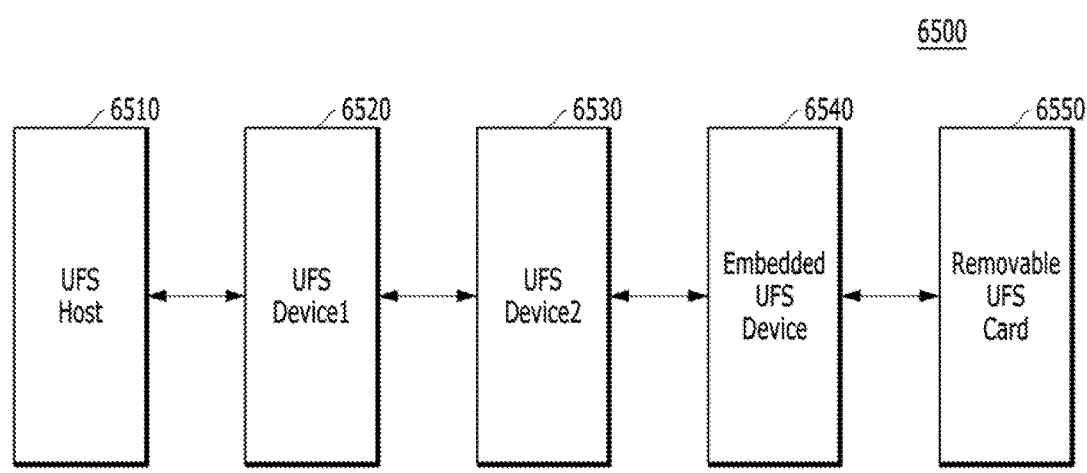

FIG. 13 is a diagram Illustrating another example of a data processing system including a memory system according to an embodiment of the present invention. For example, in FIG. 13, a universal flash storage (UFS) 6500 employing the memory system is shown.

Referring to FIG. 13, the UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 9. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 14:
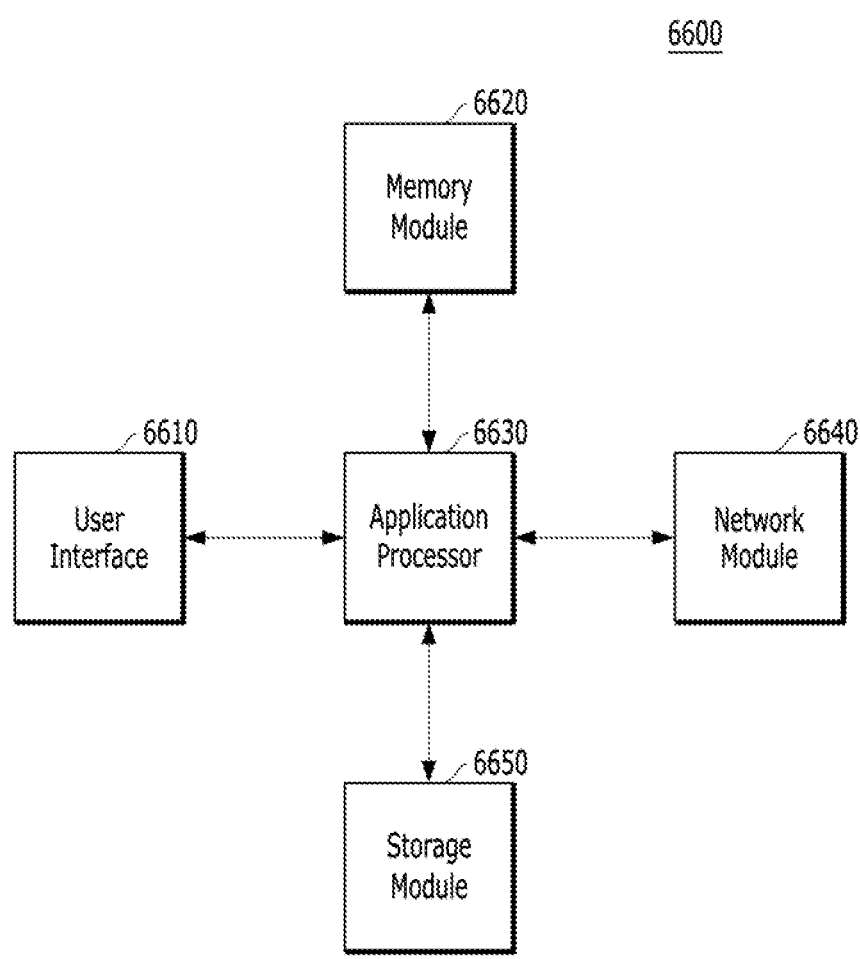

FIG. 14 is a diagram illustrating another example of a data processing system including the memory system according to an embodiment of the present invention. For example, in FIG. 14, a user system 6600 employing the memory system is shown.

Referring to FIG. 14, the user system 6600 may include a user interface 6610, a memory module 6620, an application processor 6630, a network module 6640, and a storage module 6650.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WIMAX), wireless local area network (WLAN), ultra-wideband (UWB), Bluetooth, wireless display (WI-DI), and so on, and may thereby communicate with wired/wireless electronic appliances, for example, a mobile electronic appliance. Accordingly, the memory system and the data processing system according to the embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be implemented by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 11 to 13.

The user interface 6610 may include interfaces for inputting data or commands to the application processor 6630 or for outputting data to an external device. For example, the user interface 6610 may include user Input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

The memory system and the operating method thereof according to the embodiments may minimize complexity and performance deterioration of the memory system and maximize use efficiency of a memory device, thereby quickly and stably process data with respect to the memory device.

Although the invention has been described in reference with various specific embodiments, it will be apparent to those skilled in this art that various changes and modifications may be made without departing from the spirit and scope of the invention as defined in the following claims.

What is claimed is:

1. A memory system comprising:
   a memory device including a plurality of memory blocks each memory block including a plurality of pages, each page including a plurality of memory cells which are coupled to a word line for storing data, wherein the plurality of memory blocks individually shares a plurality of memory device buffers, included in the memory device, for storing data related to a write operation or a read operation; and
   a controller including a memory, the controller being suitable for receiving a write command and a read command from a host, storing write data corresponding to the write command in the memory, transmitting and storing the write data stored in the memory to and in at least one first memory device buffer operatively coupled to a first memory block in a page of which the write data are to be stored, reading read data corresponding to the read command from a page of a second memory block, storing the read data in at least one second memory device buffer operatively coupled to the second memory block, and storing the read data stored in the second memory device buffer, in the memory, wherein the at least one first memory device buffer and the at least one second memory device buffer are individually selected from the plurality of memory device buffers to be engaged with the first and second memory blocks, and physically isolated from each other.

2. The memory system according to claim 1, wherein the controller stores the write data in the first memory device buffer, then stops performing the program operation, and performs the read operation in a state in which performing of the program operation is stopped, wherein the write data and the read data are concurrently and individually remained in the at least one first memory device buffer and the read data in the at least one second memory device buffer.

3. The memory system according to claim 2, wherein the controller completes the read operation by providing the read data stored in the memory, to the host and then after completion of the read operation the controller resumes and completes the program operation.

4. The memory system according to claim 3, wherein the controller writes and stores the write data which are stored in the first memory device buffer, in pages of the first memory block.

5. The memory system according to claim 1, wherein the controller receives simultaneously the write command and the read command from the host.

6. The memory system according to claim 1, wherein the controller receives the read command from the host, after receiving the program command and before completing the program operation.

7. A memory system comprising:
   a memory device including a plurality of memory dies, each of the plurality of memory dies including a plurality of planes, each of the plurality of planes including a plurality of memory blocks, wherein the plurality of memory blocks individually shares a plurality of buffers, included in the memory device, for storing data related to a write operation or a read operation; and a controller including a memory, and suitable for receiving a write command and a read command from a host, storing write data corresponding to the write command, in the memory, transmitting and storing the write data stored in the memory, to and in at least one first buffer of a first memory die for which a program operation corresponding to the write command is to be performed, among the plurality of memory dies, reading read data corresponding to the read command from pages of memory blocks included in the first memory die, storing the read data in at least one second buffer of the first memory die, and storing the read data stored in the second buffer, in the memory, wherein the at least one first buffer and the at least one second buffer are individually selected from the plurality of buffers to be engaged with the first and second memory blocks, and physically isolated from each other.

8. The memory system according to claim 7, wherein the controller stops performing of the program operation by storing the write data in the first buffer, and performs the read operation corresponding to the read command, in pages of memory blocks included in the first memory die, in a state in which performing of the program operation is stopped, wherein the write data and the read data are concurrently and individually remained in the at least one first buffer and the read data in the at least one second buffer.

9. The memory system according to claim 8, wherein the controller resumes the program operation with the stopped state, after completing performing of the read operation by providing the read data stored in the memory, to the host.

10. The memory system according to claim 9, wherein the controller writes and stores, after completing performing of the read operation, the write data stored in the first buffer, in pages of memory blocks included in the first memory die.

11. The memory system according to claim 7, wherein the controller receives simultaneously the write command and the read command from the host.

12. The memory system according to claim 7, wherein the controller receives the read command from the host, after storing the write data in the memory and before completing performing of the program operation.

13. A method for operating a memory system, comprising:
receiving a write command and a read command from a host, for a memory device including a plurality of memory dies, each of the plurality of memory dies including a plurality of planes, each of the plurality of planes including a plurality of memory blocks, wherein the plurality of memory blocks individually shares a plurality of buffers, included in the memory device, for storing data related to a write operation or a read operation;
storing write data corresponding to the write command, in a memory included in a controller;
transmitting and storing the write data stored in the memory, to and in at least one first buffer selected from the plurality of buffers;
reading read data corresponding to the read command from pages of memory blocks included in the plurality of memory dies;
storing the read data in at least second buffer selected to be engaged with the pages of memory blocks from the plurality of buffers; and
storing the read data stored in the second buffer, in the memory.

14. The method according to claim 13, further comprising:
stopping performing of a program operation corresponding to the write command, by storing the write data in the first buffer; and
performing a read operation corresponding to the read command, in a state in which performing of the program operation is buffered,
wherein the write data and the read data are concurrently and individually remained in the at least one first buffer and the read data in the at least one second buffer.

15. The method according to claim 14, further comprising:
resuming the program operation with the stopped state, after completing performing of the read operation by providing the read data stored in the memory, to the host.

16. The method according to claim 15, wherein the resuming of the program operation comprises storing, after completing performing of the read operation, the write data stored in the first buffers, in pages of memory blocks included in the plurality of memory dies.

17. The method according to claim 13, wherein the receiving of the write command and the read command comprises receiving simultaneously the write command and the read command from the host.

18. The method according to claim 13, wherein the receiving of the write command and the read command comprises receiving the read command from the host, after storing the write data in the memory and before completing performing of the program operation corresponding to the write command.

19. The method according to claim 13,
wherein the first buffer is included in a first memory die for which the program operation corresponding to the write command is to be performed, among the plurality of memory dies, and
wherein the second buffer is included in a second memory die for which the read operation corresponding to the read command is to be performed, among the plurality of memory dies.

20. The method according to claim 13, wherein the first buffer and the second buffer are included in a first memory die for which the program operation corresponding to the write command and the read operation corresponding to the read command are to be respectively performed, among the plurality of memory dies.

* * * * *